United States Patent
Cave

(10) Patent No.: US 7,237,951 B2
(45) Date of Patent: Jul. 3, 2007

(54) SUBSTRATE BASED TEMPERATURE SENSING

(75) Inventor: David L Cave, Tempe, AZ (US)

(73) Assignee: Andigilog, Inc., Tempe, AZ (US)

( * ) Notice: Subject to any disclaimer, the term of this patent is extended or adjusted under 35 U.S.C. 154(b) by 125 days.

(21) Appl. No.: 11/096,701

(22) Filed: Mar. 31, 2005

(65) Prior Publication Data

US 2006/0222049 A1    Oct. 5, 2006

(51) Int. Cl.
*G01K 7/01* (2006.01)
*H01L 31/00* (2006.01)

(52) U.S. Cl. ..................... 374/178; 327/513

(58) Field of Classification Search ............... 374/178; 327/512, 513
See application file for complete search history.

(56) References Cited

U.S. PATENT DOCUMENTS

| | | | | |
|---|---|---|---|---|
| 6,097,239 A | * | 8/2000 | Miranda et al. | 327/512 |
| 6,957,910 B1 | * | 10/2005 | Wan et al. | 374/183 |
| 7,010,440 B1 | * | 3/2006 | Lillis et al. | 702/65 |

* cited by examiner

*Primary Examiner*—Diego Gutierrez
*Assistant Examiner*—Mirellys Jagan
(74) *Attorney, Agent, or Firm*—Donald J. Lenkszus

(57) ABSTRACT

A method for providing accurate temperature sensing of a substrate utilizing the PN junction of a transistor formed on the substrate is described.

2 Claims, 1 Drawing Sheet

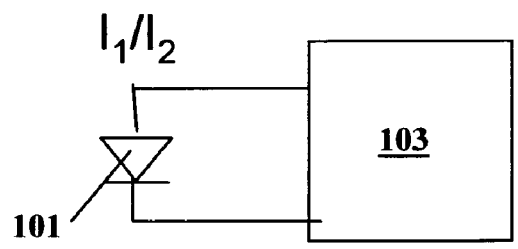
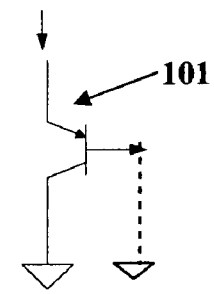
Fig. 1          Fig. 2
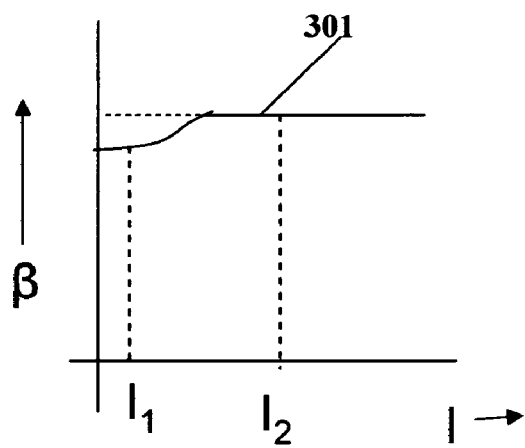
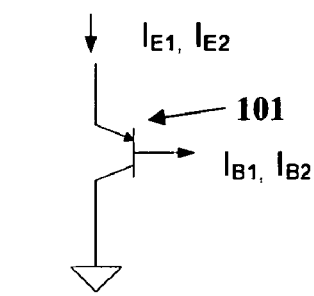
Fig. 3          Fig. 4
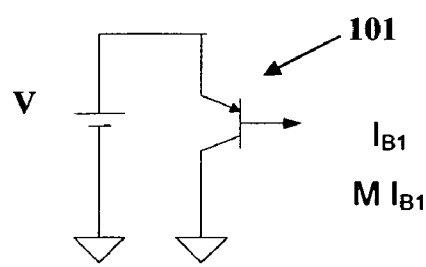
Fig. 5

SUBSTRATE BASED TEMPERATURE SENSING

FIELD OF THE INVENTION

This invention pertains to temperature sensing apparatus, in general, and to an easily calibrated temperature sensing apparatus, in particular.

BACKGROUND OF THE INVENTION

A typical approach to measuring temperatures is to utilize a PN diode junction as a temperature sensor. In integrated circuit applications, the PN junction is typically provided by using a bipolar transistor integrated into the substrate.

In investigating the properties of PN junction temperature sensors, I have determined that certain inaccuracies result from the standard methodology utilized to sense temperatures of substrates of microprocessors.

SUMMARY OF THE INVENTION

In accordance with the principles of the invention, an improved method of determining the temperature of substrates is provided.

In accordance with the principles of the invention two methods of providing improved and more accurate temperature sensing are provided.

In a first methodology in accordance with the principles of the invention, non constant β characteristics of a sensing transistor are compensated in the current provided to the transistor emitter.

In a second methodology in accordance with the principles of the invention, the transistor base current is utilized to determine the temperature of the PN junction.

DETAILED DESCRIPTION

The invention will be better understood from a reading of the following detailed description of illustrative embodiments of the invention in which like reference indicator are utilized to identify like elements, and in which:

FIG. 1 illustrates a temperature sensing configuration to which the invention may be advantageously applied;

FIG. 2 illustrates a temperature sensing transistor;

FIG. 3 illustrates the characteristic curve of a PNP transistor's β characteristic;

FIG. 4 illustrates a sensing transistor operated in accordance with one principle of the invention; and FIG. 5 illustrates a sensing transistor operated in accordance with another principle of the invention.

DETAILED DESCRIPTION

FIG. 1 illustrates a typical temperature sensing configurations utilized as part of a temperature sensing and controlling arrangement for use with highly integrated devices such as microprocessors. The configuration includes a PN junction 101 that is subjected to two current levels $I_1$ and $I_2$, by a temperature sensing and control circuit 103.

As shown in FIG. 2, PN junction 101 typically comprises a bipolar transistor. The bipolar transistor is known to give a transfer equation of $$V_{be} = \eta KT/q \ln I_c/I_o$$

Using this knowledge it is possible to determine the temperature of a transistor by driving it with two different currents whose ratio is M. In so doing, the difference in $V_{be}$ between current $I_{c1}$ and $I_{c2}$ is:

$$\Delta V_{be} = \eta KT/q \ln M,$$

where η (emission coefficient), K (Boltzmanns Constant), q (electron charge), and ln M are all constants. Thus T (in Kelvin) is directly proportional to $\Delta V_{be}$.

In many circuits, however, the standard bipolar transistor available is a substrate PNP (P source/drain, N well, P substrate), thus we are unable to drive or control the collector current as the collector is tied via the silicon substrate to circuit ground.

Since only the emitter and base terminals are available, the current industry standard practice is to drive the emitter with currents $I_{E1}$ and $I_{E2}$ whose ratio is M.

If $\beta_1 I_{E1} = \beta_2 I_{E2}$ then the collector ratio is also M and temperature is easily determined.

In high performance CMOS processes it is unlikely that $\beta_1 = \beta_2$, further in these processes β is typically very low (0.5-2.0). This is shown in the graph of FIG. 3 by curve 301. In this case $I_{E1}/I_{E2} \neq I_{C1}/I_{C2}$ The problem is indicated if the equation for $\Delta V_{be}$ is modified to read:

$$\Delta V_{be} = \eta KT/q \ln[I_{E2}(\beta_1+1)\beta_2]/[I_{E1}(\beta_2+1)\beta_1]$$

If for example $\beta_1 = 0.7$ and $\beta_2 = 0.8$ we may record an error of 10° C. when using the industry approach of driving the emitter. This error is not tolerable when system requirements are errors of 1° C. or less.

In accordance with a first method to correct for this error, beta correction is utilized.

We wish to control $I_{C2}/I_{C1} = M$ thus, $M = (I_{E2} - I_{B2})/(I_{E1} - I_{B1})$ and we can show $$I_{E2} = MI_{E1} + (I_{B2} - MI_{B1})$$

If $\beta_1 = \beta_2$ the second term goes to zero and we drive $I_{E2}/I_{E1} = M$. However, for instances in which $\beta_1 \neq \beta_2$ we modify the current drive to satisfy the above equation.

In accordance with the principles of the invention, a method and circuit implementation to achieve the above equation is as follows:

1. Drive $I_{E1}$ and record $I_{B1}$, $V_{be1}$ and create $MI_{B1}$
2. Drive $MI_{E1}$ and record $I_{B2}$
3. Add $I_{B2} - MI_{B1}$ current to $MI_{E1}$
4. Record $V_{be2}$
5. $\Delta V_{be} = V_{be2} - V_{be1}$
6. Compute temperature This arrangement of transistor 101 is shown in FIG. 4

In accordance with the principles of the invention, the base drive may be utilized. It is a little known and/or used fact that base current also follows an exponential equation $$V_{be} = \eta KT/q \ln I_B/I_o \text{ and thus, } \Delta V_{be} = \eta KT/q \ln I_{B2}/I_{B1}$$

In accordance with this equation accurate temperatures may be recorded by referencing the emitter of transistor 101 to a common voltage V and current driving the base with current $I_{B1}$ and $I_{B2}$ such that $I_{B2}/I_{B1} = M$ as shown in FIG. 5

The invention has been described in terms of illustrative embodiments of the invention. It will be apparent to those skilled in the art that various changes may be made without departing from the spirit of scope of the invention. It is not intended that the invention be limited by the embodiments disclosed and described.

What is claimed is:

1. A method of accurately sensing the temperature of a substrate having a sensing transistor formed therein, comprising:

providing a first emitter drive current, $I_{E1}$:

recording a first base current, $I_{B1}$:

recording a first base emitter voltage, $V_{be1}$:

determining a base current, $MI_{B1}$, M being a predetermined multiple:

providing an emitter drive current, $MI_{E1}$:

recording the base current, $I_{B2}$, resulting from said emitter drive current:

provide a second emitter drive current that is the summation of $I_{B3}-MI_{B1}$ and $MI_{E1}$:

recording a second base emitter voltage, $V_{be3}$ determining $\Delta V_{be}=V_{be2}-V_{be1}$:

computing the junction temperature of said sensing transistor by utilizing $\Delta V_{be}$.

2. An arrangement for measuring the temperature of a substrate, comprising:

a sensing transistor on said substrate;

a sensing and control circuit coupled to said transistor, said sensing and control circuit operating said transistor under first drive conditions to produce a first response and operating said transistor under second drive conditions having a predetermined relationship to said first drive conditions to produce a second response, said sensing and control circuit utilizing said first and said second in accordance with a predetermined algorithm to determine the temperature of said substrate;

said sensing and control circuit providing a first emitter drive current and recording a corresponding first base current and a corresponding first base emitter voltage, and providing an emitter drive current which is a predetermined multiple, M, of said first emitter drive current and recording a corresponding second base current; and providing a second emitter drive current that is the summation of said emitter drive current and the second base current minus the multiple, M times the first base current and recording a corresponding resulting second base emitter voltage:

determining a voltage differential that is the difference between said first base emitter voltage and said second base emitter voltage $V_{be2}$; and determining the junction temperature of said sensing transistor from said voltage difference in accordance with said predetermined algorithm.

* * * * *